(12) United States Patent
Peterman et al.

(10) Patent No.: US 8,064,350 B2
(45) Date of Patent: Nov. 22, 2011

(54) METHOD AND SYSTEM FOR SIMPLIFYING PROTOCOL ANALYSIS

(75) Inventors: Jimmie D. Peterman, Glenndale, MD (US); Henry A. McKelvey, Capitol Heights, MD (US); Rosa M. Underwood, Washington, DC (US); Emory L. Young, Reisterstown, MD (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 268 days.

(21) Appl. No.: 12/238,211

(22) Filed: Sep. 25, 2008

(65) Prior Publication Data

US 2010/0074124 A1 Mar. 25, 2010

(51) Int. Cl.
*H04L 1/00* (2006.01)
*H04L 12/26* (2006.01)
*H04J 3/14* (2006.01)
*H04J 1/16* (2006.01)

(52) U.S. Cl. ............ 370/241.1; 370/240; 370/231; 370/221

(58) Field of Classification Search ............ 370/236.2, 370/241.1, 242, 248, 401, 467, 352, 397, 370/399, 400, 405; 709/220, 227, 231, 230, 709/249, 221
See application file for complete search history.

(56) References Cited

U.S. PATENT DOCUMENTS

6,424,653 B1 * 7/2002 Arsikere et al. ............ 370/401
2006/0221841 A1 * 10/2006 Lee et al. .................. 370/242
* cited by examiner

*Primary Examiner* — Kwang B Yao
*Assistant Examiner* — Adam Duda (57) ABSTRACT

A system and method in accordance with exemplary embodiments may include receiving, from a user system, one or more protocol analysis request messages via a network, transmitting, to one or more multipurpose interface devices, one or more control signals based on the one or more protocol analysis request messages, receiving, from the one or more multipurpose interface devices, protocol analysis data associated with data traffic transmitted on one or more test networks in response to the transmitted control signals, and outputting, to the user system, the protocol analysis data via the network.

21 Claims, 10 Drawing Sheets

Network Interface Configuration Graphical User Interface

300

End Point Interface 1
Off ⌄   Standard Mode ⌄

End Point Interface 2
Off ⌄   Standard Mode ⌄

End Point Interface 3
Off ⌄   Standard Mode ⌄

End Point Interface 4
Off ⌄   Standard Mode ⌄

Submit Interface Parameters

Filter Configuration Graphical User Interface

500

First Filter Parameter

[Enter First Filter Parameter Here]

Second Filter Parameter

[Enter Second Filter Parameter Here]

Third Filter Parameter

[Enter Third Filter Parameter Here]

Fourth Filter Parameter

[Enter Fourth Filter Parameter Here]

[Submit Custom Filter(s)]

Figure 5

Screen Display Graphical User Interface

600

Page Layout
○ Landscape  ○ Portrait

Font Color
[Black ▽]

Font Size
[8 pt. ▽]

Page Size
○ 8.5 in. X 11 in.
○ 11 in. X 14 in.
○ [Enter Other Size]

Font Type
[Times New Roman ▽]

[Submit Screen Display Parameter(s)]

Figure 6

Report Graphical User Interface

700

Report Generation

Enter Name of Type of Report Here

Report Transmission

Enter Destination of Report Here

Submit Report Parameter(s)

Archived Reports and Capture Files Graphical User Interface

Archived Report Request

[ Enter File Name of Archived Report Here ]

Archived Capture Request

[ Enter File Name of Archived Capture Here ]

[ Submit Archived Report and/or Archived Capture Parameter(s) ]

METHOD AND SYSTEM FOR SIMPLIFYING
PROTOCOL ANALYSIS

BACKGROUND INFORMATION

A network may include numerous nodes that are physically separated by substantial amounts of land. In many instances, testing such a network (e.g., performing protocol analysis) may require multiple technicians to use various electronic devices to coordinate the capture of a specific network event, such as, data traffic flowing on the numerous nodes. Often times, however, these electronic devices utilize graphical user interfaces that are cryptic and are not user friendly. Such cryptic interfaces may increase the difficulty for the multiple technicians to capture the specific network event. In addition, coordinating the multiple technicians to capture at approximately the same time may be overly burdensome.

BRIEF DESCRIPTION OF THE DRAWINGS

Purposes and advantages of the exemplary embodiments will be apparent to those of ordinary skill in the art from the following detailed description in conjunction with the appended drawings in which like reference characters are used to indicate like elements, and in which.

These and other embodiments and advantages will become apparent from the following detailed description, taken in conjunction with the accompanying drawings, illustrating by way of example the principles of the various exemplary embodiments.

DETAILED DESCRIPTION OF PREFERRED EMBODIMENTS

The description below describes physical and logical elements of a network, some of which are explicitly shown in figures, others that are not. The inclusion of some physical elements of a network system may help illustrate how a given network may be modeled. It should be noted, however, that all illustrations are purely exemplary and that the network scheme described herein may be performed on different varieties of networks which may include different physical and logical elements.

Figure 1:
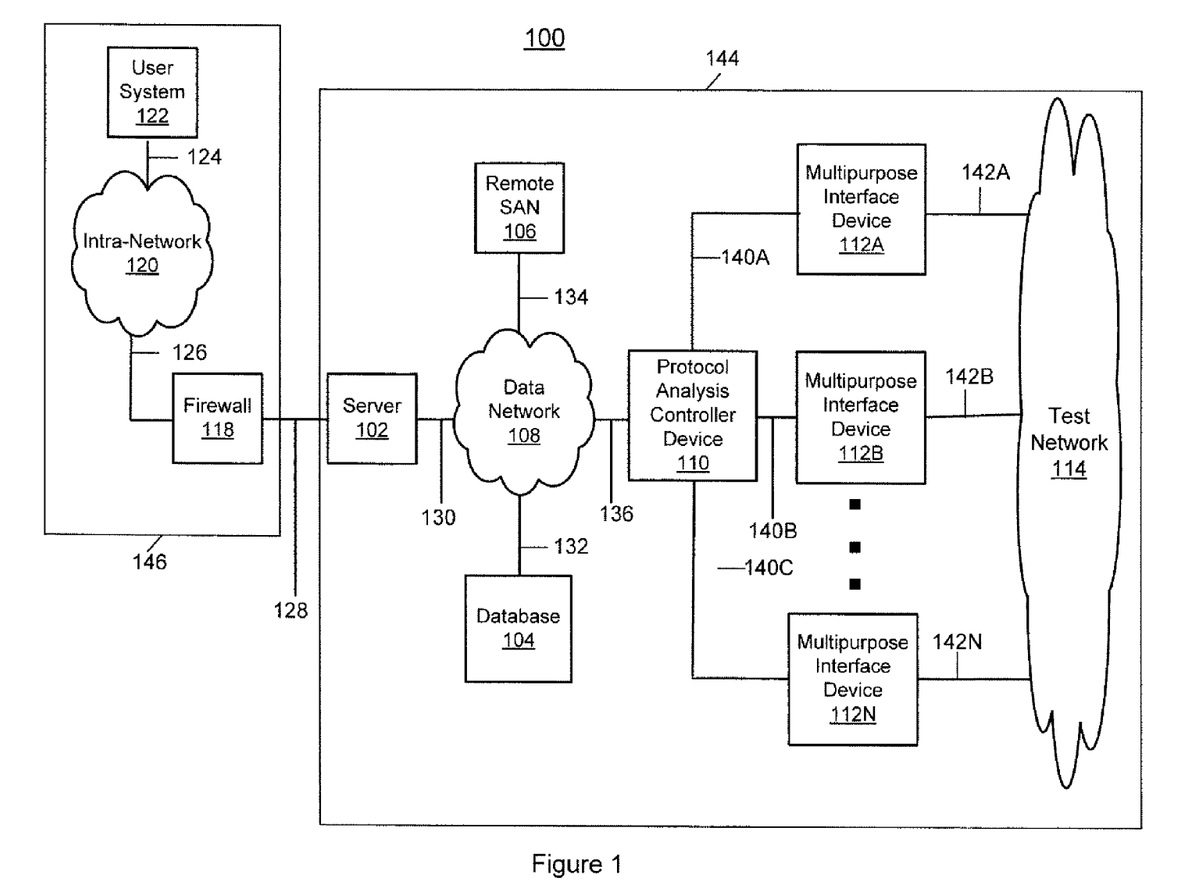
FIG. 1 illustrates a block diagram of a simplified protocol analysis network, in accordance with exemplary embodiments.

For instance, the simplified protocol analysis network 100 from FIG. 1 illustrates a simplified view of a passive optical network and various elements in the passive optical network. It is noted that other hardware and software not depicted may be included in network 100. It is also noted that network 100 illustrates a specific number of instances of user systems, intra networks, firewalls, servers, remote storage area networks (SANs), databases, data networks, protocol analysis controller devices, multipurpose interface devices, and/or test networks. It will be appreciated that a single instance and/or multiple instances of these entities may be included in a network.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, and/or combinations thereof. Moreover, the figures illustrate various components (e.g., user systems, firewalls, servers, remote SANs, databases, protocol analysis controller devices, and multipurpose interface devices, etc.) separately. The functions described as being performed at various components may be performed at other components, and the various components may be combined and/or separated. Other modifications also may be made.

In an exemplary embodiment, data traffic transmitted through a passive optical network (PON) may be analyzed using one or more remotely controlled multipurpose interface devices. In various embodiments, data traffic may include one or more data packets that carry video information, audio information, and/or any other type of information in electronic form. In various embodiments, a multipurpose interface device may include any software and/or hardware configured to operate as a protocol analyzer and/or perform protocol analysis functions. For example, multipurpose interface device may include one or more packet sniffers, one or more network sniffers, one or more network analyzers, one or more Ethernet sniffers, one or more wireless sniffers, and/or any other software and/or hardware that may be used to perform protocol analysis functions. The one or more multipurpose interface devices may be placed at various physical locations within the PON, such as, at various nodes. Accordingly, the one or more multipurpose interface devices may be controlled and/or managed by one or more protocol analysis controller devices.

In an exemplary embodiment, one or more protocol analysis controller devices may be communicatively coupled to the PON and one or more multipurpose interface devices such that one or more protocol analysis controller devices may communicate signals to and receive signals from the one or more multipurpose interface devices. Based on one or more signals received from one or more protocol analysis controller devices, one or more multipurpose interface devices may intercept one or more data packets transmitted on the PON, filter one or more data packets transmitted on the PON, and/or transmit protocol analysis data associated with one or more data packets transmitted on the PON to one or more protocol analysis controller devices.

In an exemplary embodiment, one or more protocol analysis controller devices may receive protocol analysis request information from one or more user systems communicatively coupled to the PON. Protocol analysis request information may include any information that is needed to specify the type of protocol analysis data desired.

In an exemplary embodiment, one or more protocol analysis controller devices may transmit one or more signals to one or more multipurpose interface devices based on the received protocol analysis request information. In an exemplary embodiment, one or more protocol analysis controller devices may transmit protocol analysis data received from one or more multipurpose interface devices to one or more storage mediums and/or one or more user systems.

FIG. 1 illustrates a block diagram of a simplified protocol analysis network 100 in accordance with exemplary embodiments. The simplified protocol analysis network 100 may include a user side 146 and/or a protocol analysis side 144. In an exemplary embodiment, the user side 146 of the simplified protocol analysis network 100 may include one or more user systems 122, one or more intra-networks 120, and/or one or more firewalls 118. In an exemplary embodiment, the protocol analysis side 144 of the simplified protocol analysis network 100 may include one or more servers 102, one or more data networks 108, one or more storage area networks (SANs) 106, one or more databases 104, one or more protocol analysis controller devices 110, one or more multipurpose interface devices 112A-112N, and/or one or more test networks 114.

The simplified protocol analysis network 100 may be in communication with the intra-network 120, the data network 108, and/or the test network 114. The intra-network 120, the data network 108, and/or the test network 114 may include one or more of a local area networks (LANs), one or more wide area networks (WANs), the Internet, one or more cellular networks, one or more satellite networks, one or more passive optical network (PONs) and/or any other networks that permit the transfer and/or reception of data. The intra-network 120, the data network 108, and/or the test network 114 may utilize one or more protocols of network clients. The intra-network 120, the data network 108, and/or the test network 114 may also translate to or from other protocols to one or more protocols of network clients. In exemplary embodiments, the intra-network 120, the data network 108, and/or the test network 114 may include one or more of the exemplary networks recited above operating as a stand-alone network or in cooperation with each other. Use of the term network herein is not intended to limit the network to a single network.

User system 122 may be in communication with or have access to one or more data networks 108 and/or one or more test networks 114 using intra-network 120. For example, user system 122 and the remainder of the simplified protocol analysis network 100 may communicate with each other using one or more of the networks described above.

User system 122 may include, but is not limited to, a computer device or communications device including, e.g., a personal computer (PC), a workstation, a mobile device, a handheld PC, a personal digital assistant (PDA), a thin system, a fat system, a network appliance, an Internet browser, a server, a lap top device, and/or any other device that is configured to receive protocol analysis data signals from one or more protocol analysis controller devices 110 or one or more multipurpose interface devices 112 and/or transmit protocol analysis request signals to one or more protocol analysis controller devices 110 using the intra-network 120 and/or the data network 108. Protocol analysis data signals may include protocol analysis data, such as, network protocol header information, network protocol trailer information, and/or data/information encapsulated by one or more network protocols. Protocol analysis request signals may include protocol analysis request information.

Figure 2:
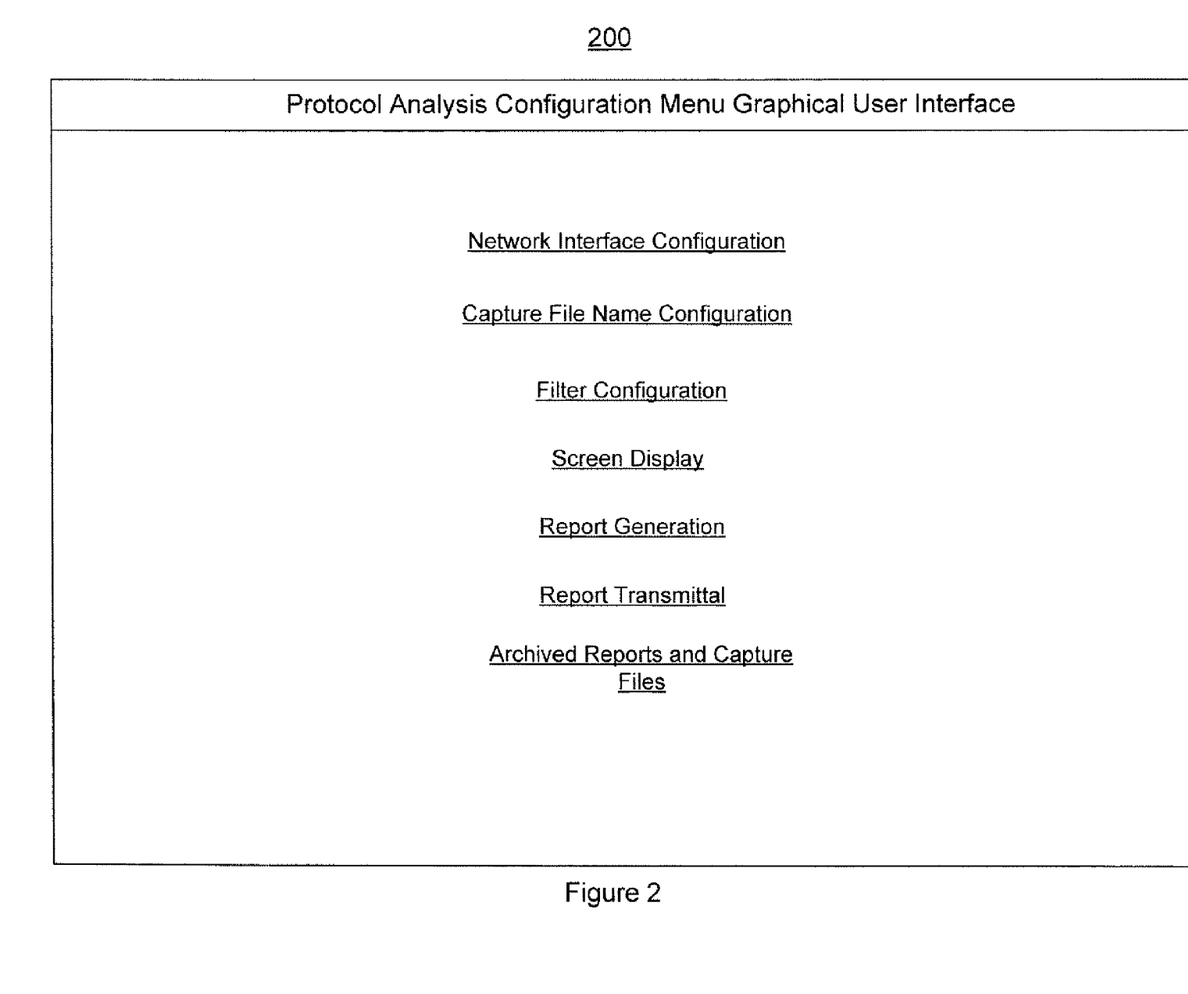
FIG. 2 illustrates an exemplary screen shot of a protocol analysis configuration menu graphical user interface, in accordance with exemplary embodiments.
Figure 3:
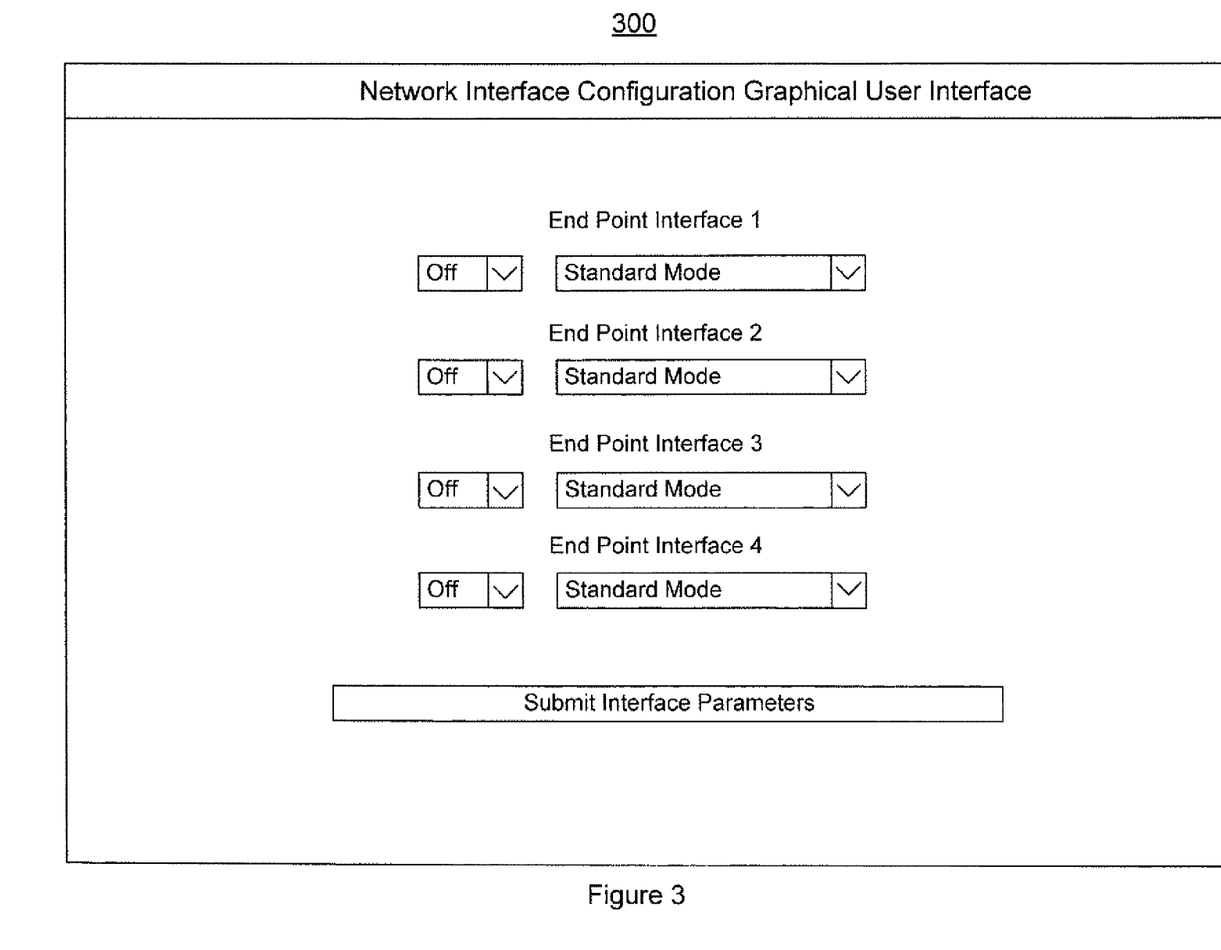
FIG. 3 illustrates an exemplary screen shot of a network interface configuration graphical user interface, in accordance with exemplary embodiments.
Figure 4:
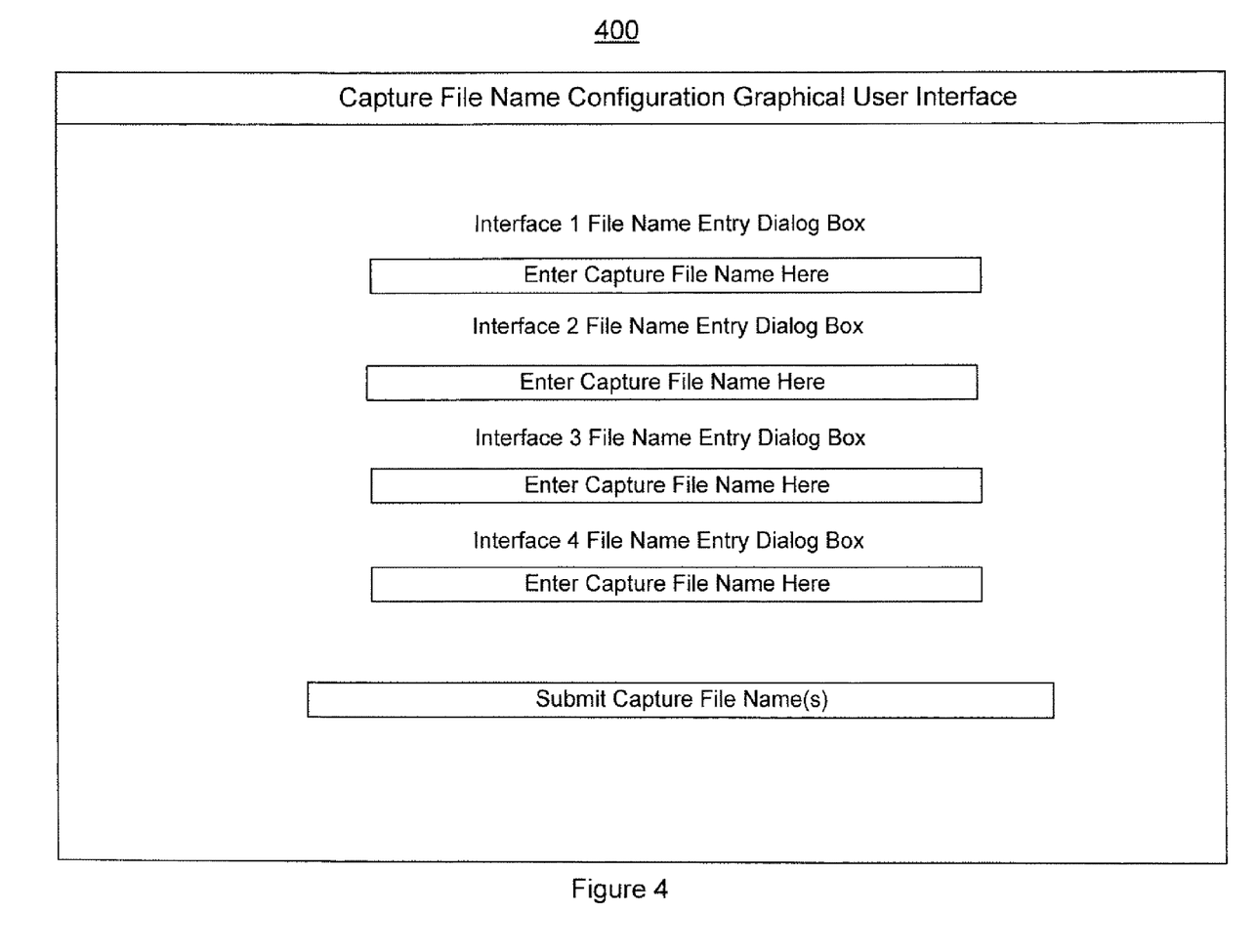
FIG. 4 illustrates an exemplary screen shot of a capture file name configuration graphical user interface, in accordance with exemplary embodiments.
Figure 5:
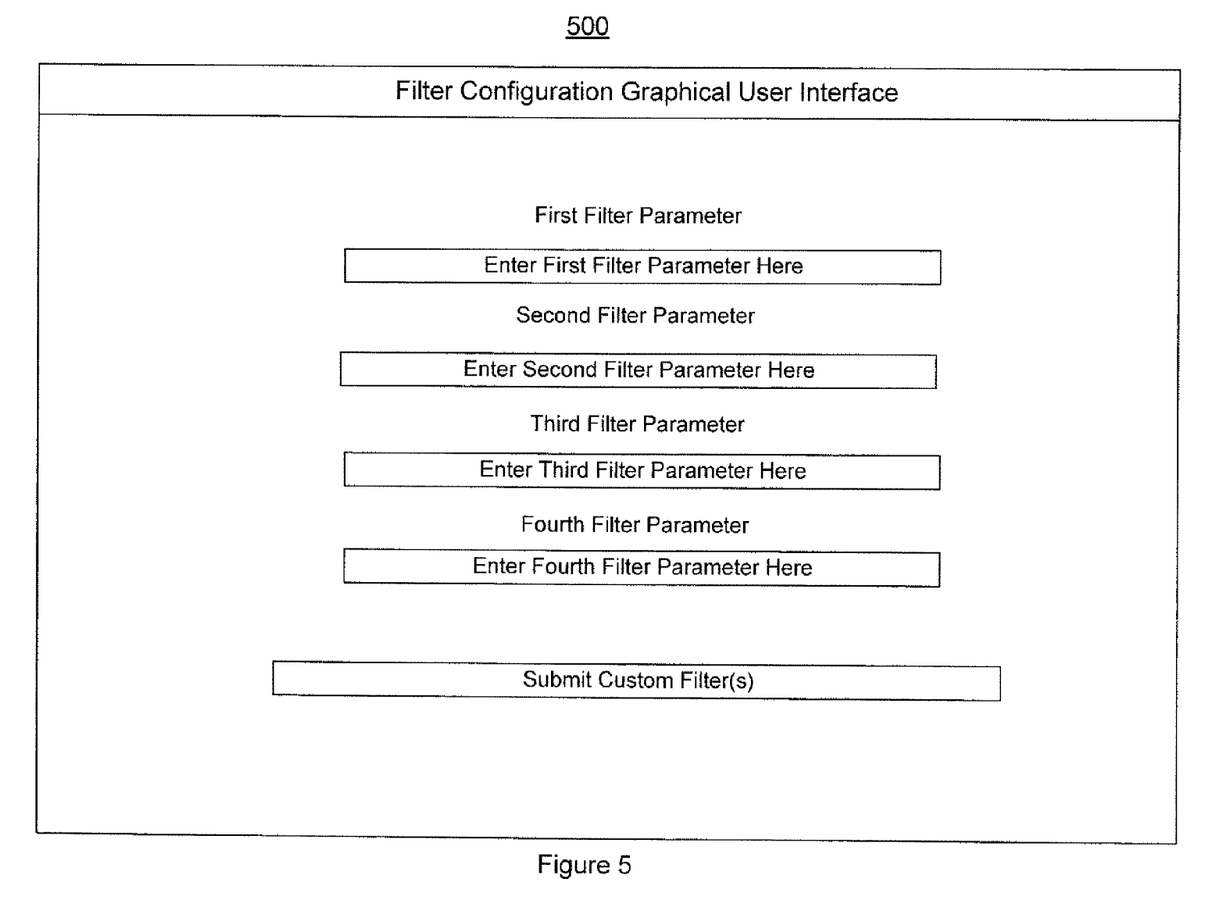
FIG. 5 illustrates an exemplary screen shot of a filter configuration graphical user interface, in accordance with exemplary embodiments.

User system 122 may include software and/or hardware configured to transmit one or more protocol analysis request signals to one or more protocol analysis controller devices 110 via data path 124. One or more protocol analysis request signals may be determined based on data inputted by a user using one or more graphical user interfaces displayed at the user system 122. For example, the user system 122 may display a protocol analysis configuration menu graphical user interface 200 as illustrated in FIG. 2, a network interface configuration graphical user interface 300 as illustrated in FIG. 3, a capture file name configuration graphical user interface 400 as illustrated in FIG. 4, and/or a filter configuration graphical user interface 500 as illustrated in FIG. 5. The graphical user interfaces illustrated in FIG. 2, FIG. 3, FIG. 4, and FIG. 5 are described in greater detail below.

User system 122 may include software and/or hardware configured to receive one or more protocol analysis data signals from one or more protocol analysis controller devices 110 or one or more multipurpose interface devices 112 via data path 124. In various embodiments, one or more display devices associated with the user system 122 may be configured to output (e.g., display) the protocol analysis data associated with the one or more protocol analysis data signals to the user.

In various embodiments, the user system 122 may be communicatively coupled to the intra-network 120 via data path 124. In various embodiments, the intra-network may be communicatively coupled to the firewall 118 via data path 126.

Given that protocol analysis data may be considered confidential information by the implementers of the simplified protocol analysis network 100, a firewall (e.g., the firewall 118) may be configured to operate as a barrier between unwanted intruders and the protocol analysis data generated by and/or stored in one or more network elements associated with the simplified protocol analysis network 100. Accordingly, the firewall 118 may include software and/or hardware configured to only allow access to authorized users using one or more authentication measures, such as, passwords, user names, security questions, finger print scanners, retina scanners, voice identifiers, and/or any other information that may be used to identify a user's identity. In various embodiments, the firewall 118 may be configured to receive data from and/or transmit data to the user side 146 of the simplified protocol analysis network 100 via data path 126. For example, the firewall 118 may be configured to receive authentication information and/or one or more protocol analysis request signals from the user system 122 via data path 126. In another example, the firewall 118 may be configured to transmit one or more protocol analysis data signals to the user system 122 via data path 126. In various embodiments, the firewall 118 may be configured to receive data from and/or transmit data to the protocol analysis side 144 of the simplified protocol analysis network 100 via data path 128. For example, the firewall 118 may be configured to receive one or more protocol analysis data signals from the server 102 via data path 128. In another example, the firewall 118 may be configured to transmit one or more protocol analysis request signals to the server 102 via data path 128. In various embodiments, the simplified protocol analysis network 100 may be implemented without a firewall 118.

The server 102 may include software and/or hardware configured to allow user access (e.g., web access, command line, client-server graphical user interface (GUI) to the remote SAN 106, the protocol analysis controller device 110, the database 104, and/or the data network 108 via data path 130. In various embodiments, the server 102 may include one or more web proxies. In various embodiments, the server 102 may include one or more middleware applications. Middleware applications may include software configured to gather protocol analysis data from one or more network elements, such as, the database 104, the remote SAN 106, and/or the protocol analysis controller device 110, and compile the gathered protocol analysis data to create one or more trouble tickets. In various embodiments, a trouble ticket may include protocol analysis data to be analyzed and/or reviewed. For example, a trouble ticket may include an information medium in which the existence of abnormal and/or unexpected protocol analysis data may be transferred to one or more entities that operate to manage one or more protocol analysis functions.

In various embodiments, the server 102 may be configured to transmit one or more protocol analysis data signals to the firewall 118 via data path 128. In various embodiments, the server 102 may be configured to transmit one or more protocol analysis request signals to the data network 108 via data path 130.

The protocol analysis controller device 110 may include software and/or hardware configured to receive one or more protocol analysis request signals from the data network 108 via data path 136. In various embodiments, one or more protocol analysis request signals may be associated with protocol analysis request information. Protocol analysis request information may include network interface information, capture file name information, filter information, screen display information, report generation information, report transmittal information, archive information, and/or any other information that is needed to perform one or more protocol analysis functions. In various embodiments, network interface information may include one or more network interface parameters that indicate each requested interface (e.g., twisted pair, fiber optic, coax) to be analyzed, the mode (e.g., standard, promiscuous) of each requested interface to be analyzed, and/or each requested node associated with a multipurpose interface device 112 to be analyzed. In various embodiments, capture file name information may include one or more capture file name parameters that indicate the name of the file in which the captured protocol analysis data is requested to be stored. In various embodiments, filter information may include one or more filter parameters that indicate the requested layers of data traffic to be analyzed, one or more requested time frames during which protocol analysis is to occur, one or more specific events associated with the PON requested to be captured, and/or the requested capture file name storing the protocol analysis data to be filtered.

The protocol analysis controller device 110 may include software and/or hardware configured to process one or more protocol analysis request signals to determine one or more control signals for one or more multipurpose interface devices 112. A control signal may include electronic information that controls and/or manages one or more protocol analysis functions performed by one or more multipurpose interface devices 112. For example, the protocol analysis controller device 110 may receive one or more protocol analysis request signals requesting protocol analysis data for the Ethernet interface of multipurpose interface device 112A and the Ethernet interface multipurpose interface device 112B between 4 pm and 5 pm of a particular day. Accordingly, the protocol analysis controller device 110 may process the one or more protocol analysis request signals and determine/transmit one or more control signals initializing the capture of the appropriate data traffic at the appropriate time.

In various embodiments, the protocol analysis controller device 110 may be configured to transmit one or more control signals to the multipurpose interface device 112A via data path 140A, transmit one or more control signals to the multipurpose interface device 112B via data path 140B, and/or transmit one or more control signals to the multipurpose interface device 112N via data path 140N.

In an exemplary embodiment, one or more control signals may indicate where the multipurpose interface device 112 should transmit the protocol analysis data. For example, during live captures (e.g., capturing data traffic and displaying protocol analysis data with negligible delay), the protocol analysis controller device 110 may transmit one or more control signals that instruct one or more multipurpose interface devices 112 to transmit the protocol analysis data to the user system 122 for display. During non-live captures, the protocol analysis controller device 110 may transmit one or more control signals that instruct one or more multipurpose interface devices to transmit the protocol analysis data to one or more storage mediums, such as, a remote SAN 106, a database 104, and/or a local storage media (not shown) located within and/or communicatively coupled to the protocol analysis controller device 110.

The multipurpose interface device 112 may be communicatively coupled to one or more test networks, such as test network 114, via data path 142. In various embodiments, a multipurpose interface device 112 may include any software and/or hardware configured to operate as a protocol analyzer and/or perform protocol analysis functions. For example, the multipurpose interface device 112 may include one or more packet sniffers, one or more network sniffers, one or more network analyzers, one or more Ethernet sniffers, one or more wireless sniffers, and/or any other software and/or hardware that may be used to perform protocol analysis functions. In various embodiments, the multipurpose interface device 112 may include software and/or hardware configured to capture data traffic transmitted on the test network 114 based on one or more control signals. In various embodiments, the multipurpose interface device 112 may include software and/or hardware configured to process the captured data traffic into protocol analysis data.

In an exemplary embodiment, the multipurpose interface device 112 may be configured to apply one or more parameters based on one or more received control signals after capturing the data traffic from the test network 114. For example, the multipurpose interface device 112 may capture the data traffic transmitted through a particular node of the test network 114 and may apply the one or more parameters to the captured data traffic to delete (e.g., filter) non-requested data once the capture is complete. In an exemplary embodiment, the multipurpose interface device 112 may be configured to apply one or more parameters based on one or more received control signals during the capture of the data traffic from the test network 114. For example, the multipurpose interface device 112 may apply the one or more parameters to the data traffic as the data traffic is being captured such that only the requested data is used to process the protocol analysis data. In an exemplary embodiment, multipurpose interface device 112A may be configured to capture data traffic transmitted on the test network 114 via data path 142A, multipurpose interface device 112B may be configured to capture data traffic transmitted on the test network 114 via data path 142B, and multipurpose interface device 112N may be configured to capture data traffic transmitted on the test network 114 via data path 142N.

In an exemplary embodiment, the remote SAN 106 may be communicatively coupled to the data network 108 via data path 134. In various embodiments, the remote SAN 106 may include software and/or hardware configured to store and/or allow user access to protocol analysis data stored in various formats. For example, the remote SAN 106 may store protocol analysis data in a network capture format (e.g., ".cap" format). In various embodiments, the remote SAN 106 may store multiple archived captures (e.g., previously provided captures) and may process the archive captures to determine one or more baselines for future capture comparisons.

In an exemplary embodiment, the database 104 may be communicatively coupled to the data network 108 via data path 132. In various embodiments, the database 104 may include software and/or hardware configured to store and/or allow user access to protocol analysis data stored in various formats. For example, the database 104 may store protocol analysis data in a spread sheet format (e.g., ".xls" format). In another example, the database 104 may store protocol analysis data in a comma-separated values format (e.g., ".csv" format). In yet another example, the database 104 may store protocol analysis data in a tuple format. In various embodiments, the database 104 may store multiple archived captures (e.g., previously provided captures) and may process the archive captures to determine one or more baselines for future capture comparisons.

In an exemplary embodiment, the database 104 may be configured to support data queries and/or modification of data by a user system 122. Accordingly, the database 104 may perform various SQL-type functionalities using one or more database applications (e.g., MySQL, PostgresSQL, Oracle).

In an exemplary embodiment, the local storage media (not shown) may include a local hard-drive, USB drive, Compact flash, Memory stick, external hard-drive, and/or any other optical storage media. In an exemplary embodiment, the local storage media associated with the protocol analysis controller device 110 may include software and/or hardware configured to store and/or allow user access to protocol analysis data stored in various formats. For example, the local storage media may store protocol analysis data in a network capture format (e.g., cap format).

The storage mediums described above (e.g., the remote SAN 106, the database 104, the local storage media (not shown)) may be configured to apply one or more protocol analysis request parameters to the stored protocol analysis data. For example, the storage mediums may apply one or more filter parameters to the stored protocol analysis data.

FIG. 2 illustrates an exemplary screen shot of a protocol analysis configuration menu graphical user interface 200, in accordance with exemplary embodiments. In an exemplary embodiment, the protocol analysis configuration menu graphical user interface 200 may be arranged as depicted in FIG. 2. The protocol analysis configuration menu graphical user interface 200 may display to a user one or more hyperlinks coupled to one or more protocol analysis graphical user interfaces. For example, protocol analysis configuration menu graphical user interface 200 may display a network interface configuration hyperlink, a capture file name configuration hyperlink, a filter configuration hyperlink, a screen display hyperlink, a report generation hyperlink, a report transmittal hyperlink, and/or an archived reports and capture files hyperlink to the user. In various embodiments, the user may access one or more of the protocol analysis graphical user interfaces to input protocol analysis request information.

In an exemplary embodiment, a user may activate (e.g., click on) a hyperlink using an input device (e.g., a mouse). For example, the user may activate the network interface configuration hyperlink to access/view the network interface configuration graphical user interface 300 illustrated in FIG. 3. In another example, the user may activate the capture file name configuration hyperlink to access/view the capture file name configuration graphical user interface 400 illustrated in FIG. 4. In yet another example, the user may activate the filter configuration hyperlink to access/view the filter configuration graphical user interface 500 illustrated in FIG. 5.

In various embodiments, the user may activate one or more hyperlinks to access/view one or more graphical user interfaces for administrative purposes. For example, the user may activate the screen display hyperlink to access/view a screen display graphical user interface 600 illustrated in FIG. 6. In another example, the user may activate the report generation hyperlink and/or the report transmittal hyperlink to access/view one or more report graphical user interfaces 700 illustrated in FIG. 7. In yet another example, the user may activate the archived reports and capture files hyperlink to access/view an archived reports and capture files graphical user interface 800 illustrated in FIG. 8.

FIG. 3 illustrates an exemplary screen shot of a network interface configuration graphical user interface 300, in accordance with exemplary embodiments. In an exemplary embodiment, the network interface configuration graphical user interface 300 may be arranged as depicted in FIG. 3. The network interface configuration graphical user interface 300 may display to a user one or more network communication interfaces (e.g., End Point Interface 1, End Point Interface 2, End Point Interface 3, End Point Interface 4) associated with one or more multipurpose interface devices 112 and one or more network interface configuration parameters. For example, a network communication interface may use any connection interface that may be used to access data traffic, such as$_7$ twisted pair, fiber optic, and/or coax and may be associated with any communication protocol (e.g., Asynchronous Transfer Mode (ATM), Ethernet, Sonet/SDH).

In an exemplary embodiment, a network interface configuration parameter may include a multipurpose interface device selection parameter and/or a multipurpose interface device mode parameter. In various embodiments, a multipurpose interface device 112 may operate in one or more modes. For example, the multipurpose interface device 112 may operate in a standard mode and/or in a promiscuous mode. In standard mode, the multipurpose interface device 112 may have an Internet Protocol (IP) address that is part of the subnet of the test network 114 to enable the capture/intercept of data traffic transmitted on the test network 114. In promiscuous mode, the multipurpose interface device 112 may have any IP address or no IP address to enable the capture/intercept of data traffic transmitted on the test network 114.

In an exemplary embodiment, the user may activate/select one or more multipurpose interface devices 112 and/or a multipurpose interface device mode for each activated/selected multipurpose interface device 112 using an input device (e.g., a mouse). For example, the network interface configuration graphical user interface 300 may display a multipurpose interface device selection drop down menu and/or a multipurpose interface device mode drop down menu associated with the End Point Interface 1. In another example, the network interface configuration graphical user interface 300 may display a multipurpose interface device selection drop down menu and/or a multipurpose interface device mode drop down menu associated with the End Point Interface 2. In another example, the network interface configuration graphical user interface 300 may display a multipurpose interface device selection drop down menu and/or a multipurpose interface device mode drop down menu associated with the End Point Interface 3. In yet another example, the network interface configuration graphical user interface 300 may display a multipurpose interface device selection drop down menu and/or a multipurpose interface device mode drop down menu associated with the End Point Interface 4. In an exemplary embodiment, the user may input one or more network interface configuration parameters using the network interface configuration graphical user interface 300. For example, the user may input one or more network interface configuration parameters by activating (e.g., clicking on) the "Submit Interface Parameters" button using an input device.

FIG. 4 illustrates an exemplary screen shot of a capture file name configuration graphical user interface 400, in accordance with exemplary embodiments. In an exemplary embodiment, the capture file name configuration graphical user interface 400 may be arranged as depicted in FIG. 4. The capture file name configuration graphical user interface 400 may display to a user one or more capture file name data fields associated with one or more network communication interfaces. In various embodiments, the user may input a name of a file in which the captured and/or processed protocol analysis data is to be stored.

For example, the capture file name configuration graphical user interface 400 may display a capture file name data field associated with End Point Interface 1. In another example, the capture file name configuration graphical user interface 400 may display a capture file name data field associated with End Point Interface 2. In another example, the capture file name configuration graphical user interface 400 may display a capture file name data field associated with End Point Interface 3. In yet another example, the capture file name configuration graphical user interface 400 may display a capture file name data field associated with End Point Interface 4. In an exemplary embodiment, the user may input one or more capture file names using the capture file name configuration graphical user interface 400. For example, the user may input one or more capture file names by activating (e.g., clicking on) the "Submit Capture File Name(s)" button using an input device.

FIG. 5 illustrates an exemplary screen shot of a filter configuration graphical user interface 500, in accordance with exemplary embodiments. In an exemplary embodiment, the filter configuration graphical user interface 500 may be arranged as depicted in FIG. 5. The filter configuration graphical user interface 500 may display to a user one or more filter parameter data fields. In various embodiments, the user may input a filter parameter that may be used to reduce the amount of data traffic captured and/or analyzed to produce protocol analysis data. In various embodiments, the user may filter data traffic based on one or more source or destination IP addresses, one or more source or destination Media Access Control (MAC) addresses, and/or one or more protocols. In various embodiments, the one or more protocols may include the User Datagram Protocol (UDP), Hot Standby Router Protocol (HSRP), Address Resolution Protocol (ARP), browser protocol, Bootstrap Protocol (BOOTP), Domain Name System (DNS) protocol, Spanning-Tree Protocol (STP), and/or any other network communication protocol.

In an exemplary embodiment, the user may input one or more filter parameters into one or more filter parameter data fields using an input device (e.g., a keyboard). For example, the user may input a first filter parameter into the filter parameter data field. In another example, the user may input a second filter parameter into the filter parameter data field. In another example, the user may input a third filter parameter into the filter parameter data field. In yet another example, the user may input a fourth filter parameter into the filter parameter data field. In an exemplary embodiment, the user may input one or more filter parameters using the filter configuration graphical user interface 500. For example, the user may input one or more filter parameters by activating (e.g., clicking on) the "Submit Custom Filter(s)" button using an input device.

Figure 6:
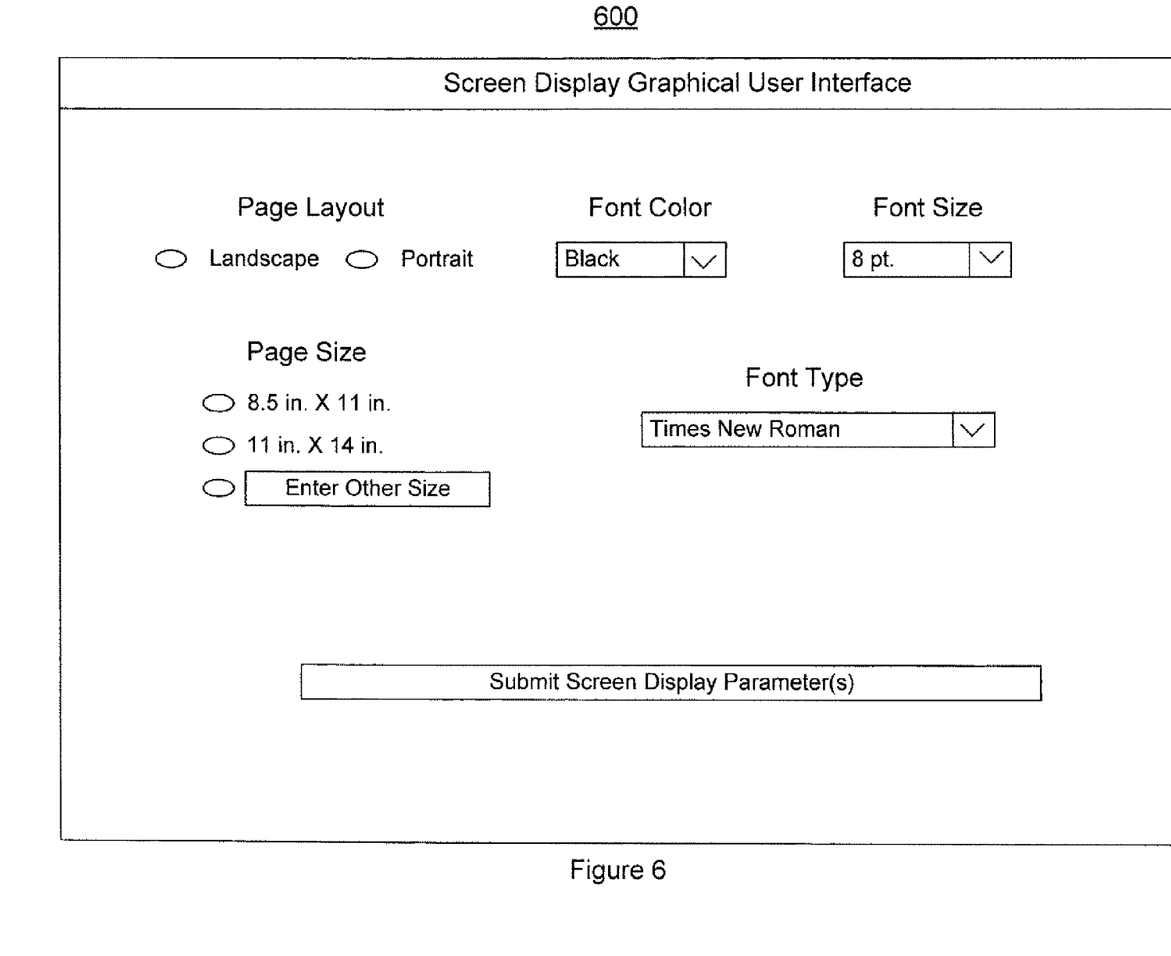
FIG. 6 illustrates an exemplary screen shot of a screen display graphical user interface, in accordance with exemplary embodiments.

FIG. 6 illustrates an exemplary screen shot of a screen display graphical user interface 600, in accordance with exemplary embodiments. In an exemplary embodiment, the screen display graphical user interface 600 may be arranged as depicted in FIG. 6. The screen display graphical user interface 600 may display to a user one or more screen display options. For example, a screen display graphical user interface 600 may enable a user to modify, view, and/or access one or more screen display options, such as, screen formatting options.

In an exemplary embodiment, screen display options may include a page layout option, a page size option, a font color option, a font size option, and/or a font type option. In various embodiments, the user may activate, select, and/or modify screen display options using an input device (e.g., a mouse). For example, the screen display graphical user interface 600 may display one or more page layout options (e.g., landscape, portrait). In another example, the screen display graphical user interface 600 may display one or more page size options (e.g., 8.5 in.×11 in., 11 in.×14 in.). In another example, the screen display graphical user interface 600 may display one or more font color options using a drop down menu. In another example, the screen display graphical user interface 600 may display one or more font size options using a drop down menu. In yet another example, the screen display graphical user interface 600 may display one or more font type options using a drop down menu. In an exemplary embodiment, the user may input one or more screen display parameters using the screen display graphical user interface 600. For example, the user may input one or more screen display parameters (e.g., options) by activating (e.g., clicking on) the "Submit Screen Display Parameter(s)" button using an input device.

Figure 7:
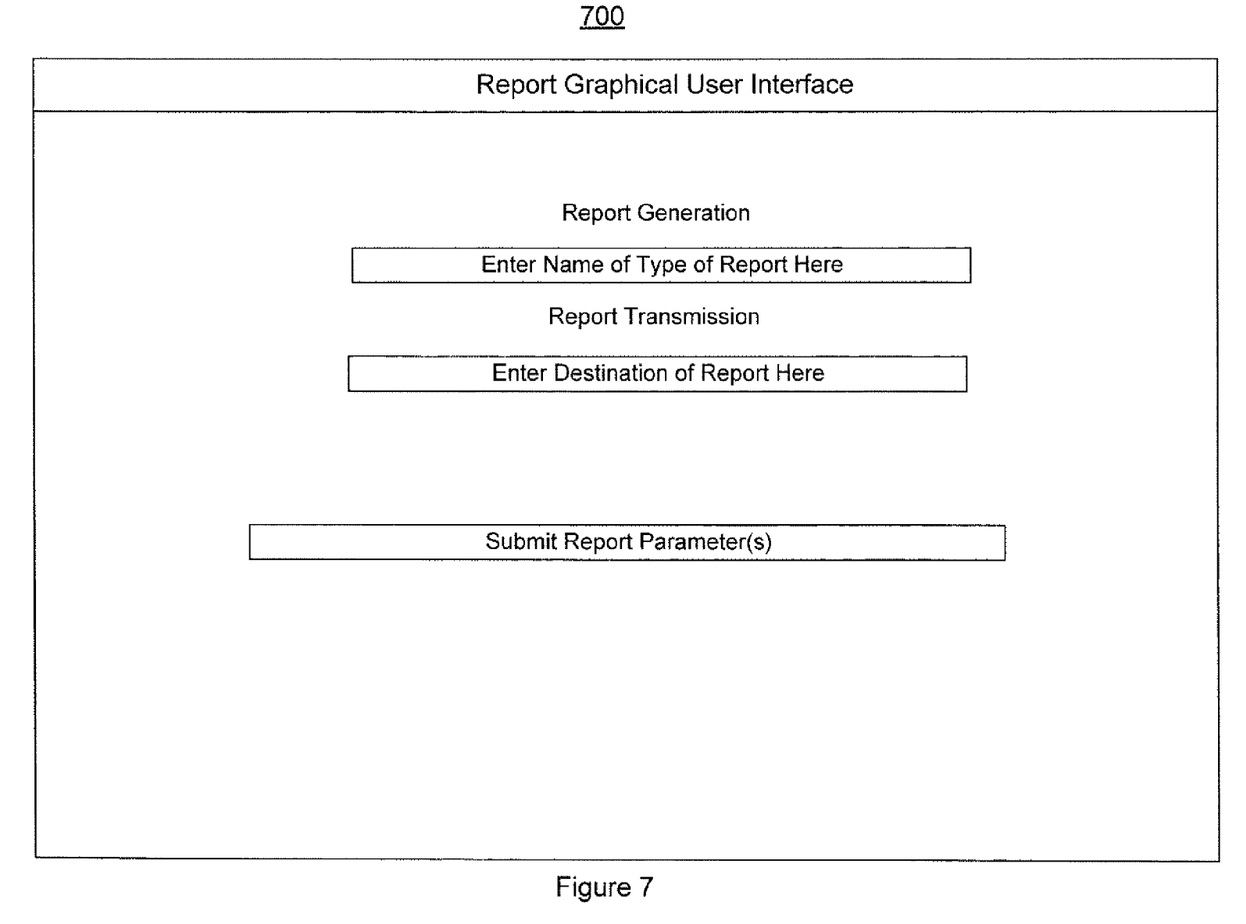
FIG. 7 illustrates an exemplary screen shot of a report graphical user interface, in accordance with exemplary embodiments.

FIG. 7 illustrates an exemplary screen shot of a report graphical user interface 700, in accordance with exemplary embodiments. In an exemplary embodiment, the report graphical user interface 700 may be arranged as depicted in FIG. 7. The report graphical user interface 700 may display to a user one or more report parameter data fields. For example, the report graphical user interface 700 may enable a user to generate, create, modify, view, and/or transmit a report based on real-time and/or stored protocol analysis data.

In an exemplary embodiment, the user may input one or more report parameters into one or more report parameter data fields using an input device (e.g., a keyboard). For example, the user may input a report type parameter into the report generation data field. In another example, the user may input a report transmission destination parameter into the report transmission data field. In an exemplary embodiment, the user may input one or more report parameters using the report graphical user interface 700. For example, the user may input one or more report parameters by activating (e.g., clicking on) the "Submit Report Parameter(s)" button using an input device.

Figure 8:
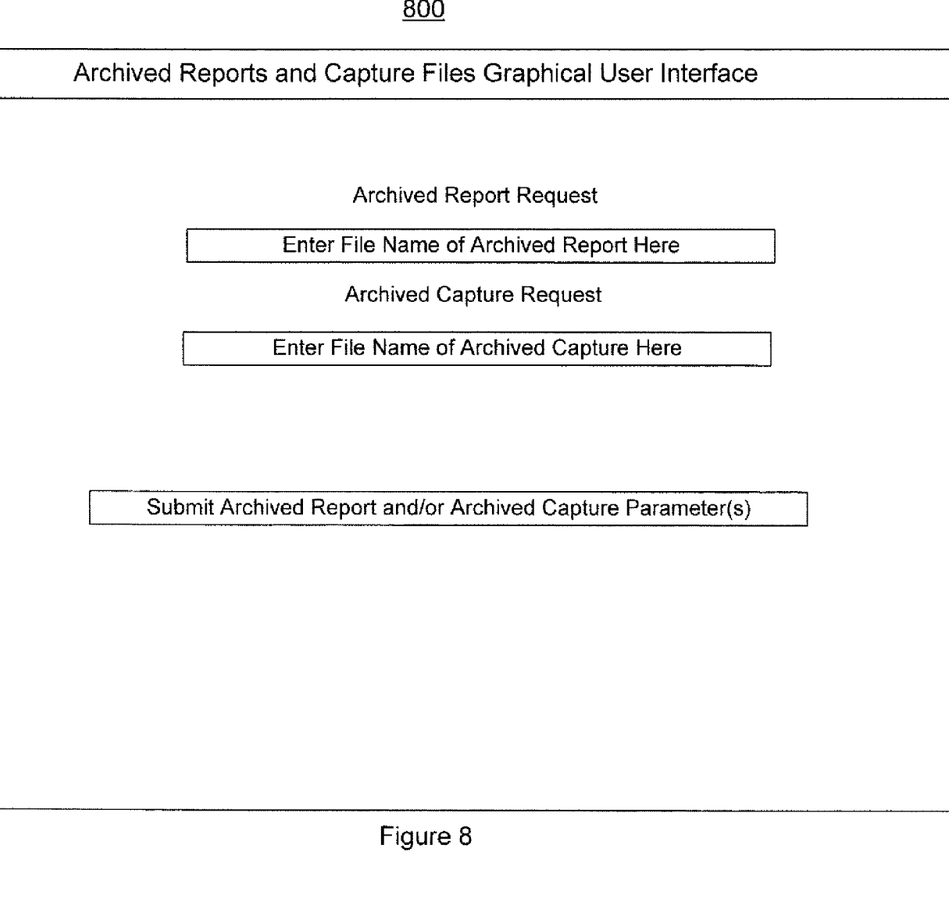
FIG. 8 illustrates an exemplary screen shot of an archived reports and capture files graphical user interface, in accordance with exemplary embodiments.

FIG. 8 illustrates an exemplary screen shot of an archived reports and capture files graphical user interface 800, in accordance with exemplary embodiments. In an exemplary embodiment, the archived reports and capture files graphical user interface 800 may be arranged as depicted in FIG. 8. The archived reports and capture files graphical user interface 800 may display to a user one or more archived report and/or archived capture data fields. For example, the archived reports and capture files graphical user interface 800 may enable a user to access, view, retrieve, and/or print one or more archived reports and/or one or more archived capture files.

In an exemplary embodiment, the user may input one or more archived report and/or archived capture parameters into one or more archived report and/or archived capture data fields using an input device (e.g., a keyboard). For example, the user may input the file name of a desired archived report into the archived report request data field. In another example, the user may input the file name of a desired archived capture into the archived capture request data field. In an exemplary embodiment, the user may input one or more archived report and/or archived capture parameters using the archived reports and capture files graphical user interface 800. For example, the user may input one or more archived report and/or archived capture file parameters by activating (e.g., clicking on) the "Submit Archived Report and/or Archived Capture File Parameter(s)" button using an input device.

It should be noted that real-time (e.g., live) protocol analysis data may be displayed to a user on a user system 122 running a graphical user interface (e.g., a JAVA graphical user interface) and/or a web-based applet.

Figure 9:
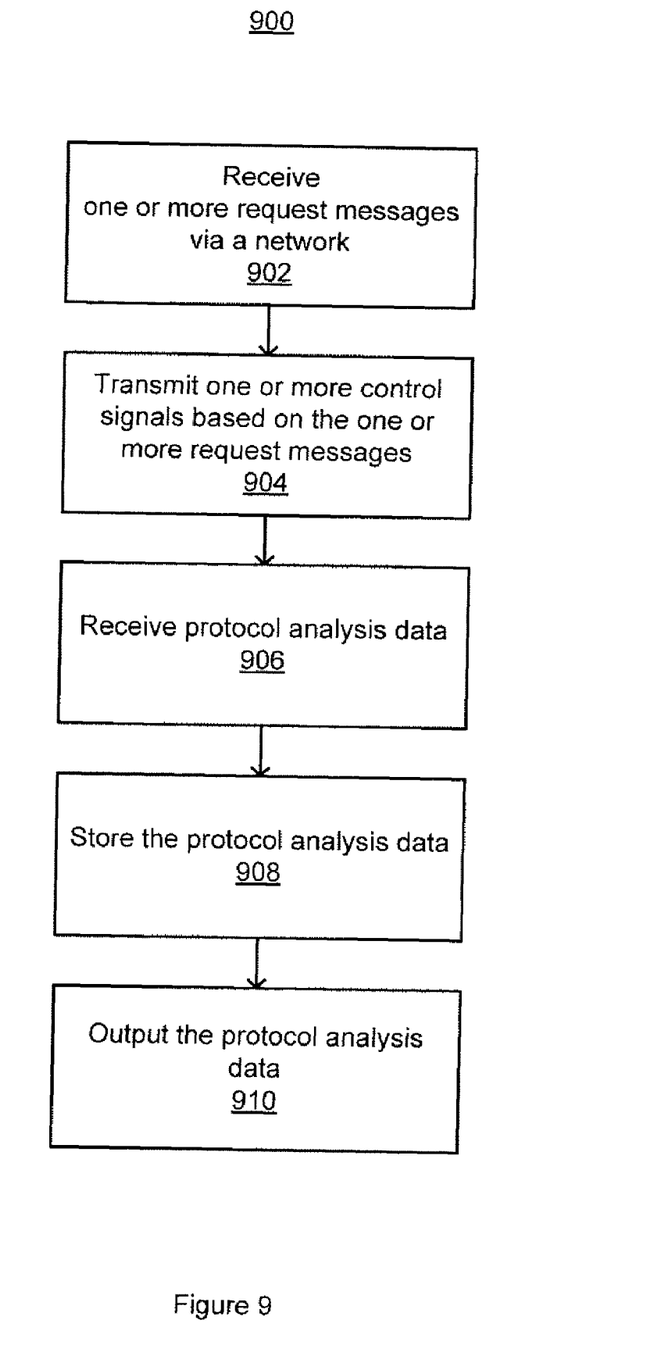
FIG. 9 illustrates a flowchart of a method for simplifying protocol analysis at a protocol analysis controller device, in accordance with exemplary embodiments.

FIG. 9 illustrates a flowchart of a method 900 for simplifying protocol analysis at a protocol analysis controller device 110, in accordance with exemplary embodiments. This exemplary method is provided by way of example, as there are a variety of ways to carry out methods disclosed herein. The method 900 shown in FIG. 9 can be executed or otherwise performed by one or a combination of various networks and/or network elements. The method 900 is described below as carried out by the protocol analysis controller device 110 shown in FIG. 1 by way of example, and various elements of the simplified protocol analysis network 100 are referenced in explaining the example method of FIG. 9. Each block shown in FIG. 9 represents one or more processes, methods, or subroutines carried out in the exemplary method 900. Referring to FIG. 9, the exemplary method 900 may begin at block 902.

In block 902, the method 900 may include receiving one or more request messages via the data network 108. In an exemplary embodiment, the protocol analysis controller device 110 may receive one or more protocol analysis request messages (e.g., one or more protocol analysis request signals) via data path 136. The protocol analysis request messages may be based on protocol analysis request information inputted by one or more users using user system 122. The method 900 may continue to block 904.

In block 904, the method 900 may include transmitting one or more control signals based on the one or more request messages. In an exemplary embodiment, the protocol analysis controller device 110 may process the one or more protocol analysis request messages to determine the one or more control signals. For example, one or more control signals may be based on one or more network interface configuration parameters, one or more capture file name parameters, and/or one or more filter parameters indicated in the one or more protocol analysis request messages. In various embodiments, the protocol analysis controller device 110 may transmit one or more control signals to one or more multi-purpose interface devices 112 based on the one or more request messages. The method 900 may continue to block 906.

In block 906, the method 900 may include receiving protocol analysis data. In an exemplary embodiment, the protocol analysis controller device 110 may receive protocol analysis data from one or more multipurpose interface devices via data path 140. The method 900 may continue to block 908.

In block 908, the method 900 may include storing protocol analysis data. In an exemplary embodiment, the protocol analysis controller device 110 may store the protocol analysis data on one or more storage mediums, e.g., on the remote SAN 106, the database 104, and/or a local storage media (not shown) communicatively coupled to the protocol analysis controller device 110. The method 900 may continue to block 910.

In block 910, the method 900 may include outputting protocol analysis data. In an exemplary embodiment, the protocol analysis controller device 110 may output the protocol analysis data to the user system 122. For example, if a user requests real time (e.g., live) protocol analysis data, the protocol analysis controller device 110 may transmit the protocol analysis data directly to the user system 122 for display by a display device associated with the user system 122. The method 900 may then end.

Figure 10:
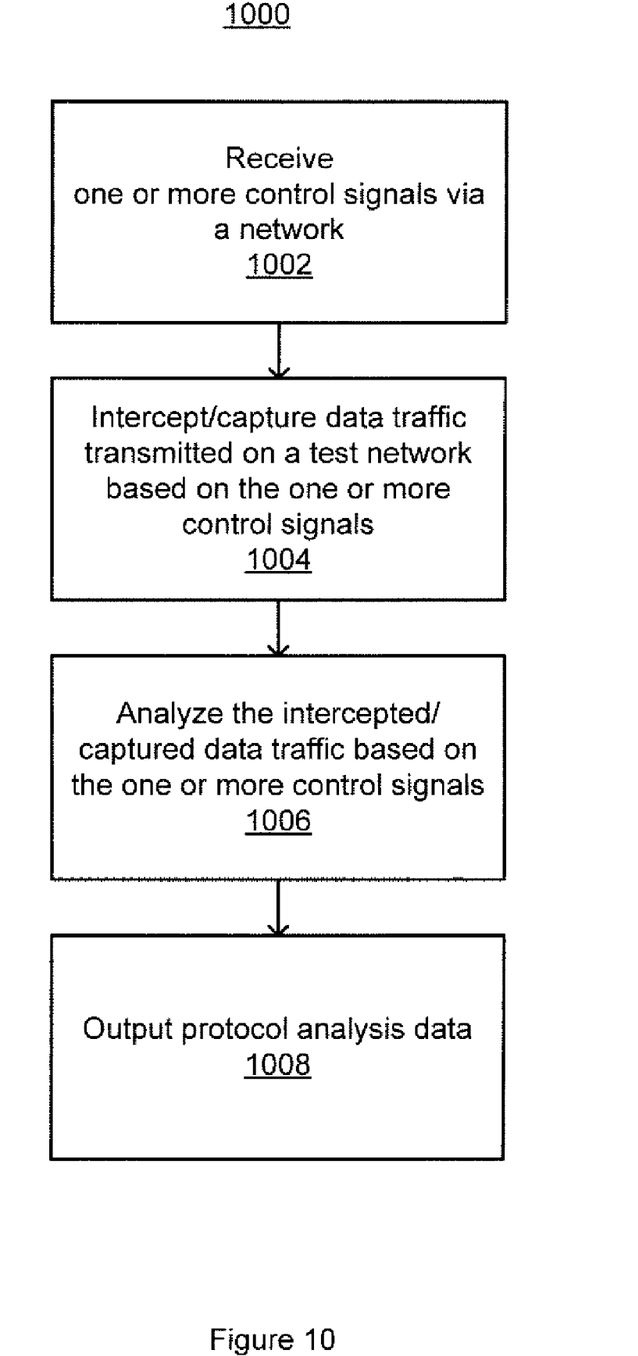
FIG. 10 illustrates a flowchart of a method for simplifying protocol analysis at a multipurpose interface device, in accordance with exemplary embodiments.

FIG. 10 illustrates a flowchart of a method 1000 for simplifying protocol analysis at a multipurpose interface device 112, in accordance with exemplary embodiments. This exemplary method is provided by way of example, as there are a variety of ways to carry out methods disclosed herein. The method 1000 shown in FIG. 10 can be executed or otherwise performed by one or a combination of various networks and/or network elements. The method 1000 is described below as carried out by the multipurpose interface device 112 shown in FIG. 1 by way of example, and various elements of the simplified protocol analysis network 100 are referenced in explaining the example method of FIG. 10. Each block shown in FIG. 10 represents one or more processes, methods, or subroutines carried out in the exemplary method 1000. Referring to FIG. 10, the exemplary method 1000 may begin at block 1002.

In block 1002, the method 1000 may include receiving one or more control signals via a network. In an exemplary embodiment, the multipurpose interface device 112 may receive one or more control signals from one or more protocol analysis controller devices 110 via data path 140. The method 1000 may continue to block 1004.

In block 1004, the method 1000 may include intercepting and/or capturing data traffic transmitted on a test network 114 based on the one or more control signals. In an exemplary embodiment, the multipurpose interface device 112 may intercept and/or capture data traffic based on the one or more control signals received from the one or more protocol analysis controller devices 10. The method 1000 may continue to block 1006.

In block 1006, the method 1000 may include analyzing the intercepted and/or captured data traffic based on the one or more control signals. In an exemplary embodiment, the multipurpose interface device 112 may analyze the intercepted and/or captured data traffic based on the one or more control signals to produce protocol analysis data. The method 1000 may continue to block 1008.

In block 1008, the method 1000 may include outputting the protocol analysis data. In an exemplary embodiment, the multipurpose interface device 112 may output the protocol analysis data to one or more protocol analysis controller devices 110. In various embodiments, the protocol analysis data may then be stored in one or more storage mediums and/or outputted to one or more user systems 122. The method 1000 may then end.

It should be noted that the multipurpose interface devices 112 described herein may be configured to be stationary devices or non-stationary devices. The multipurpose interface devices 112 may be placed at various nodes within a network, such as, a passive optical network (PON). For example, the multipurpose interface devices 112 may be placed at one or more ingress points of a network and/or one or more egress points of a network.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

The invention claimed is:

1. A method, comprising:
receiving, at a protocol analysis controller device, one or more protocol analysis request messages via a network from a user system, wherein the one or more protocol analysis request messages comprise at least one filter parameter that identifies a protocol, among a plurality of protocols, to be analyzed by a plurality of multipurpose interface devices;
transmitting, to the plurality of multipurpose interface devices, one or more control signals based on the one or more protocol analysis request messages, wherein each multipurpose interface device is communicatively coupled to a node in a test network, and wherein each multipurpose interface device is configured to capture data traffic transmitted on the test network based on the one or more control signals;
receiving, from the plurality of multipurpose interface devices, protocol analysis data associated with the data traffic transmitted on the test network in response to the transmitted control signals; and
outputting, to the user system, the protocol analysis data via the network.

2. The method of claim 1, wherein the one or more protocol analysis request messages comprise protocol analysis request information.

3. The method of claim 1, further comprising processing the one or more protocol analysis request messages to determine the one or more control signals.

4. The method of claim 1, wherein the one or more control signals comprise filter information.

5. The method of claim 1, wherein the plurality of multipurpose interface devices comprise a plurality of protocol analyzers.

6. The method of claim 1, further comprising storing the protocol analysis data in at least one of a database, local store media, and a remote storage area network (SAN) that are communicatively coupled to the network.

7. The method of claim 1, wherein the outputted protocol analysis data is based on real-time data.

8. The method of claim 1, wherein the outputted protocol analysis data is based on stored data.

9. The method of claim 1, wherein the test network comprises a passive optical network.

10. A non-transitory computer readable media comprising code to perform the acts of the method of claim 1.

11. A system, comprising:
one or more storage mediums for storing protocol analysis data; and
a protocol analysis controller device communicatively coupled to the one or more storage mediums and a network, the protocol analysis controller device is configured to:
receive, from a user system, one or more protocol analysis request messages via the network, wherein the one or more protocol analysis request messages comprise at least one filter parameter that identifies a protocol, among a plurality of protocols, to be analyzed by a plurality of multipurpose interface devices;
transmit, to the plurality of multipurpose interface devices, one or more control signals based on the one or more protocol analysis request messages, wherein each multipurpose interface device is communicatively coupled to a node in a test network, and wherein each multipurpose interface device is configured to capture data traffic transmitted on the test network based on the one or more control signals;
receive, from the plurality of multipurpose interface devices, protocol analysis data associated with the data traffic transmitted on the test network in response to the transmitted control signals;
store the protocol analysis data in the one or more storage mediums; and
output, to the user system, the protocol analysis data via the network.

12. The system of claim 11, wherein the one or more protocol analysis request messages comprise protocol analysis request information.

13. The system of claim 11, wherein the protocol analysis controller device is further configured to process the one or more protocol analysis request messages to determine the one or more control signals.

14. The system of claim 11, wherein the one or more control signals comprise filter information.

15. The system of claim 11, wherein the plurality of multipurpose interface devices comprise a plurality of protocol analyzers.

16. The system of claim 11, wherein the one or more storage mediums comprise at least one of a database, a local storage media, and a remote storage area network (SAN).

17. The system of claim 11, wherein the outputted protocol analysis data is based on real-time data.

18. The system of claim 11, wherein the outputted protocol analysis data is based on stored data.

19. The system of claim 11, wherein the test network comprises a passive optical network.

20. A method, comprising:
receiving, at a protocol analysis controller device, one or more protocol analysis request messages via a network from a user system, wherein the one or more protocol analysis request messages comprise at least one filter parameter that identifies a protocol, among a plurality of protocols, to be analyzed by a plurality of multipurpose interface devices;
processing the one or more protocol analysis request messages to determine one or more control signals;
transmitting, to the plurality of multipurpose interface devices, the one or more control signals based on the one or more protocol analysis request messages, wherein each multipurpose interface device is communicatively coupled to a node in a test network, and wherein each multipurpose interface device is configured to capture data traffic transmitted on the test network based on the one or more control signals;
receiving, from the plurality of multipurpose interface devices, protocol analysis data associated with the data traffic transmitted on the test network in response to the transmitted control signals;
storing the protocol analysis data in at least one of a database, local storage media, and a remote storage area network (SAN) that are communicatively coupled to the network; and
outputting, to the user system, the protocol analysis data via the network.

21. A non-transitory computer readable media comprising code to perform the acts of the method of claim 20.

* * * * *